April 3, 1962 R. T. CLEARY ET AL 3,028,452

LOUDSPEAKING TELEPHONE USING TRANSISTORS

Filed Jan. 15, 1957 5 Sheets-Sheet 1

INVENTORS
ROBERT T. CLEARY
ROBERT V. BURNS
BY ROBERT F. HUCKSTADT

C. A. Gulbrandsen
ATTY.

April 3, 1962 R. T. CLEARY ET AL 3,028,452

LOUDSPEAKING TELEPHONE USING TRANSISTORS

Filed Jan. 15, 1957 5 Sheets-Sheet 2

INVENTORS
ROBERT T. CLEARY
ROBERT V. BURNS
BY ROBERT F. HUCKSTADT
C. A. Gulbrandsen
ATTY.

April 3, 1962 R. T. CLEARY ET AL 3,028,452

LOUDSPEAKING TELEPHONE USING TRANSISTORS

Filed Jan. 15, 1957 5 Sheets-Sheet 3

INVENTORS
ROBERT T. CLEARY
ROBERT V. BURNS
BY ROBERT F. HUCKSTADT

C. A. Gulbrandsen
ATTY.

April 3, 1962 R. T. CLEARY ET AL 3,028,452

LOUDSPEAKING TELEPHONE USING TRANSISTORS

Filed Jan. 15, 1957 5 Sheets-Sheet 4

INVENTORS
ROBERT T. CLEARY
ROBERT V. BURNS
ROBERT F. HUCKSTADT
BY

C. A. Gulbrandsen
ATTY.

April 3, 1962 R. T. CLEARY ET AL 3,028,452

LOUDSPEAKING TELEPHONE USING TRANSISTORS

Filed Jan. 15, 1957 5 Sheets-Sheet 5

INVENTORS
ROBERT T. CLEARY
ROBERT V. BURNS
ROBERT F. HUCKSTADT

BY C. A. Gullbrandsen
ATTY.

United States Patent Office 3,028,452
Patented Apr. 3, 1962

3,028,452

LOUDSPEAKING TELEPHONE USING TRANSISTORS

Robert T. Cleary, Lockport, Robert V. Burns, Markham, and Robert F. Huckstadt, Chicago, Ill., assignors to Automatic Electric Laboratories, Inc., a corporation of Delaware Filed Jan. 15, 1957, Ser. No. 634,184
3 Claims. (Cl. 179—81)

The invention relates to loudspeaking telephone systems. More particularly, it addresses itself to systems of this kind, hereinafter referred to as "selective" loudspeaking systems, which are arranged both for "distant-talking" by means of a microphone and loudspeaker and for regular or "close-range" communication by means of a handset.

Present day loudspeaking telephone systems generally employ as a means of amplification vacuum tubes which are powered from the commercial alternating current network. While these loudspeaking systems are fully satisfactory in operation they require relatively bulky equipment. Previously proposed selective loudspeaking systems, for example, consist of at least three equipment units, namely a subset which houses, in addition to the regular subset components, one of the distant-talking transducers; a cabinet which houses the other distant-talking transducer; and a steel cabinet housing the remaining equipment needed for loudspeaking operation. This last-mentioned equipment includes a hybrid transformer, two vacuum tube amplifiers, one for the microphone and and the other for the speaker, the rather voluminous power supply equipment for these amplifiers and a push-button operated relay for turning the power supply on or off and for performing the remaining switching functions required to transfer the system from one to the other type operation.

Because of its considerable size and weight the steel cabinet must be bolted to the underside of the subscriber's desk or to some other out-of-the-way supporting surface; moreover, the numerous interconnections required call for a comparatively heavy cable between the cabinet and the subset. These factors make it difficult to move the loudspeaking apparatus from place to place. Furthermore, a prerequisite for the operation of a system of this kind is that a commercial power network is available at the location in question and that there is no power failure at the time the loudspeaking facilities are needed, such as in the case of an urgent conference.

A principal object of the invention is to provide a loudspeaking telephone system, particularly one of the "selective" type, in which these drawbacks are avoided.

Expressed in a different way it is an object of the present invention to provide a loudspeaking system, especially a selective loudspeaking system, which is compact, comparatively light-weight and yet rugged, inexpensive in manufacture and yet safe and reliable in operation, easily serviceable and independent of a source of commercial power.

According to the main feature of the invention the amplifiers required for loudspeaking operation are transistor amplifiers which are supplied with the necessary bias voltages from the central office battery over the line to which the loudspeaking apparatus is connected. A filter arrangement comprising both series and shunt elements, is provided for substantially removing from the bias supply alternating current components which are due to the voice frequencies transmitted over the line. Some of the filter elements are interposed between the bias supply for the microphone amplifier and the bias supply for the speaker amplifier so as to decouple the two amplifiers from each other.

In the preferred embodiment of the invention disclosed herein in which the invention is shown applied to a selective loudspeaking system, at least one of the two amplifiers together with its associated distant-talking transducer, such as the microphone, is mounted in the subset itself, preferably on a plug-in type printed circuit card. The other transistor amplifier may be mounted in a small cabinet housing the other distant-talking transducer, for example the loudspeaker.

The two transistor amplifiers are coupled to the line by means of a Wheatstone bridge of resistances which takes the place of the conventional hybrid coil. Power for the transistor amplifiers is obtained, through the filter arrangement mentioned above, from a diode bridge connected across a silicon-carbide resistance which is serially inserted in the direct current line circuit. The non-linear resistor renders the supply voltage reasonably independent of line length, and the rectifier bridge guards against current reversal at the central office end of the line. In connection with the diode bridge and the silicon-carbide resistor reference is made to copending application Serial No. 624,765, filed on November 28, 1956 by A. H. Faulkner and H. C. Talcott, now Patent No. 2,885,484, May 5, 1959. The dimensions of the diode bridge, the filter components and the resistance coupling bridge are sufficiently small to enable these circuit elements also to be mounted on the printed circuit card in the subset.

Switching from one type of operation to the other is effected directly at the contacts of manual switching means mounted in the subset. For this purpose the embodiment shown herein provides a combination push-and-turn key; when this key is turned to its rotary "on" position it switches the system from handset operation to loudspeaking operation and when the key is thereafter depressed it causes the microphone to be shunted, namely if the user of the telephone wishes temporarily to prevent the distant party from overhearing a conversation that may be carried on in the user's room. In this respect the present invention is a further development of the arrangement disclosed in United States patent application Serial No. 614,608, filed by H. C. Smith on October 8, 1956.

In the previously proposed selective loudspeaking system the "on" condition of the loudspeaking components, in particular the amplifiers, is indicated to the user by a pilot or supervisory lamp the power for which is derived from the commercial power line. In accordance with one feature of the invention the advantage of an "on" indicating lamp are retained in spite of the fact that no commercial power is employed for the purpose of feeding this lamp.

This is accomplished by using a neon lamp and by connecting this lamp to the output of a small transistor type blocking oscillator which furnishes the high-voltage low-current power required to supply the neon tube. The transistor oscillator, in turn, is powered with the relatively low voltage required for its operation by way of the subscriber line, namely through the medium of the same non-linear resistor and diode bridge that also supplies the two voice amplifiers; this transistor oscillator also is mounted on the printed circuit card in the subset. In the preferred arrangement the gas-tube is part of a gas-tube oscillator supplied by the aforementioned blocking oscillator through a diode. The resultant flashing type operation of the neon tube has the advantage that it provides a more distinct supervisory signal, particularly in bright surroundings and that it further reduces the power consumption of the lamp.

The invention thus provides a complete selective loudspeaking system which consists of only two equipment units, namely a subset which may be of conventional shape and dimension, and a small cabinet for one of the two distant-talking transducers, the two units being interconnected by a small cable requiring no more than three conductors The additional large steel cabinet required by the previous systems has thus been completely eliminated.

The invention both as to its organization and method of operation together with other objects and features thereof, will best be understood by reference to the following specification taken in connection with the accompanying drawings. In these drawings:

FIGS. 1, 2 and 3 combined show the circuit of the loudspeaking telephone according to the invention. More particularly:

Figure 1:
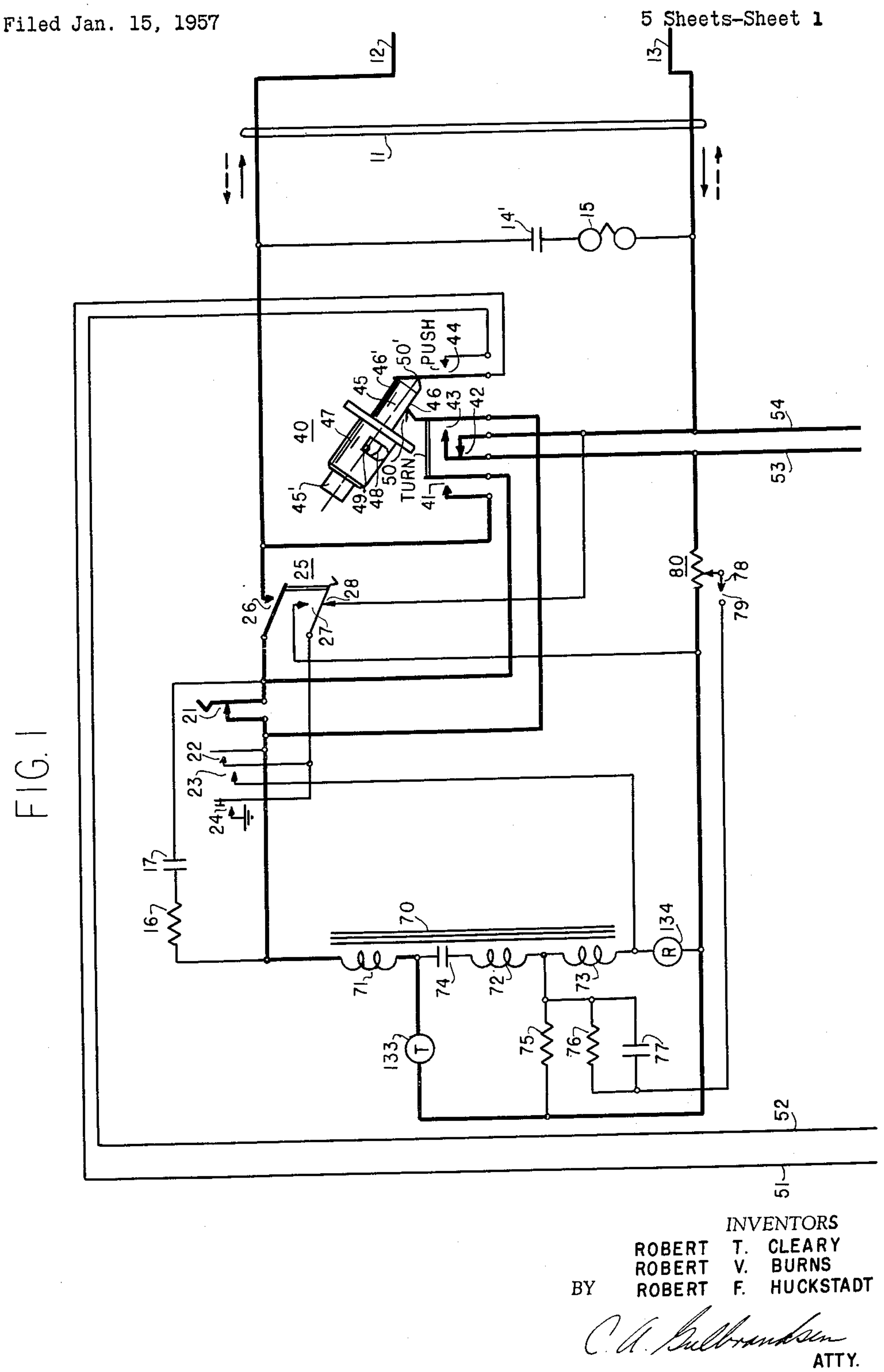
FIG. 1 shows the subset components which are required for handset operation and for switching from one type of operation to the other.
Figure 2:
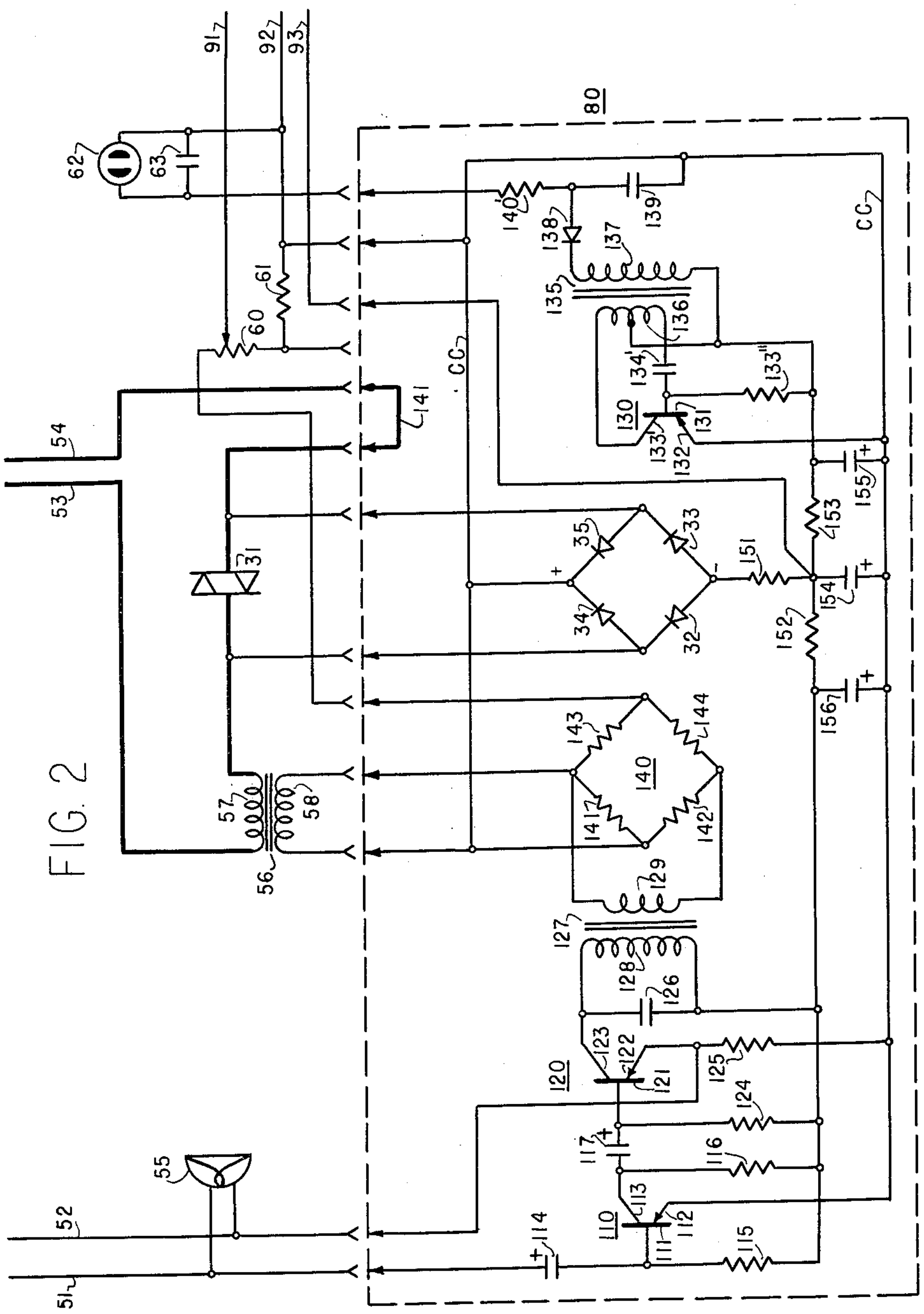
FIG. 2 shows that part of the loudspeaking equipment proper which is mounted in the subset itself.
Figure 4:
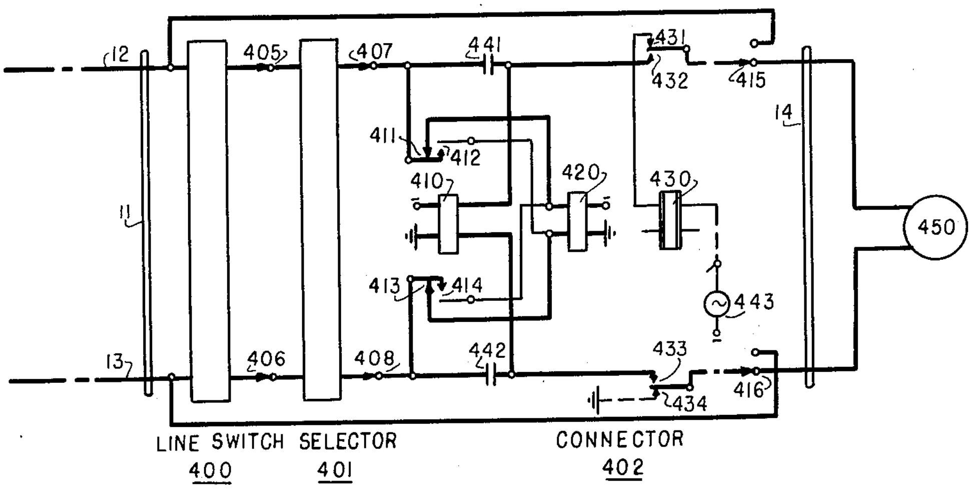
FIG. 4 is a schematic diagram of the central office equipment.
Figure 3:
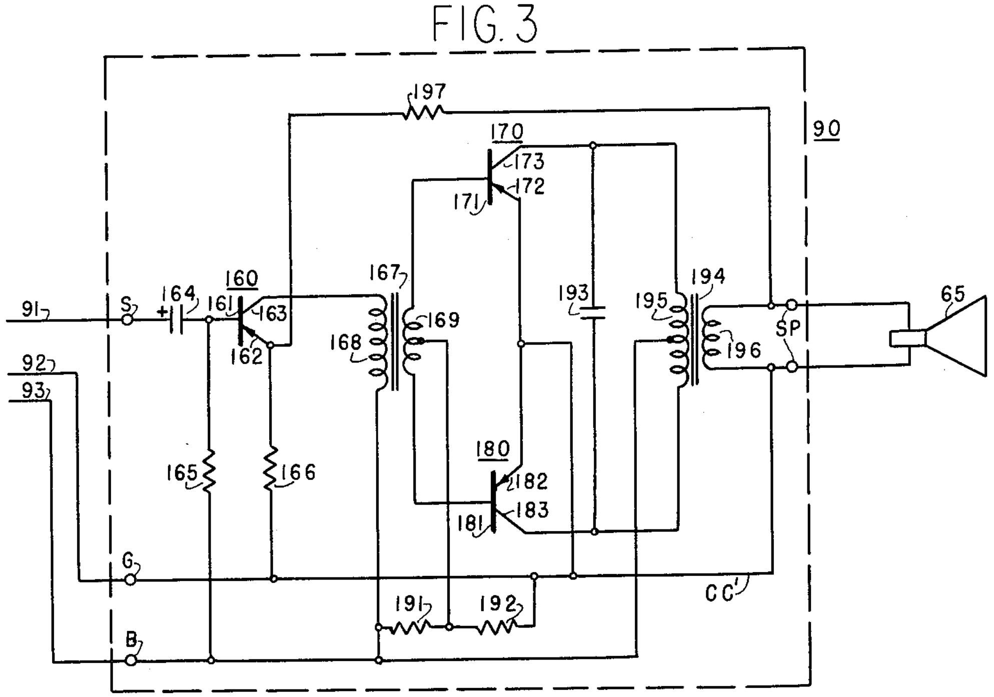
FIG. 3 shows the part of the loudspeaking equipment which is mounted in the speaker cabinet.

FIGS. 1 to 4 form a unified circuit diagram if FIG. 2 is placed below FIG. 1 and if FIGS. 3 and 4 are placed to the right of FIGS. 2 and 1, respectively.

The circuit arrangement, FIGS. 1–3, of the loudspeaking telephone will be described first. Referring to FIG. 1, the transmission circuit shown in the left-hand portion of this figure is patterned after the transmission circuit disclosed in copending United States patent application Serial No. 592,401, filed by H. C. Pye on June 19, 1956 and also shown in the above-mentioned application Serial No. 624,765. The transmission circuit includes an anti-sidetone induction coil 70 having a line winding 71, another winding 72 and an anti-sidetone winding 73, all connected in an aiding sense with respect to each other. The transmission circuit further includes a blocking condenser 74 and a balancing impedance 75. Rheostat 80 serves as a line compensating resistance, and resistance 76 and condenser 77 form an auxiliary balancing network. Transmitter 133 and receiver 134 are the two close-range-talking transducers which are mounted in the handset of the substation.

FIG. 1 further shows ringer 15 which, in series with its associated condenser 14′, is bridged directly across the two conductors 12, 13 of subscriber line 11. The calling device or dial of the substation includes impulse springs 21, dial shunt springs 22, 23 and station identifying springs 24. The last-mentioned springs are arranged automatically to ground the line, near the end of each impulse series and noncoincidently with the dial pulses, a predetermined number of times depending on the identity of the substation in question. A dial having a pair of identifying springs of this kind is disclosed, for example, in United States Patent 2,581,697 to J. E. Ostline. Resistance 16 and condenser 17 act as spark suppression equipment in connection with dial impulse springs 21.

As shown in FIG. 1, switchhook spring assembly 25 includes a line contact 26 which closes the line loop when the handset is removed from the cradle. Break-make contacts 27, 28 of this assembly serve to prepare different circuits for the dial shunt springs depending on whether the handset is on or off the hook.

FIG. 1 also shows combination push-and-turn key 40. As will be noted from this figure, both the turn and push springs of this key are part of the same spring pick-up are actuated directly by a common plunger 45. This plunger which is made of insulating material and whose main portion is of geenrally cylindrical shape, is mounted for both rotary and axial sliding movement in stationary bushing 47. As shown in FIG. 1, actuating spring 50 of the turn portion of the key cooperates with a flat or cut-off surface 46 extending parallel to the plunger axis on one side of plunger 45, while actuating spring 50′ of the push portion of the key cooperates with a substantially conical portion at the extreme lower end of the plunger.

Thus when plunger 45 by means of its handle end 45′ is rotated by 90 degrees, actuating spring 50 rides up on the cylindrical surface 46′ of the plunger and is thereby displaced to the left in FIG. 1 so that contacts 41, 43 are closed and contact 42 is opened. On the other hand, if plunger 45 is depressed, actuating spring 50′ is displaced to the right and as a result contact 44 is closed. It will be noted that these two actions of the key are independent of each other. Transversely inserted in the bearing portion of plunger 46 is a small pin 49 which cooperates with the inner surfaces of a substantially rectangular slot 48 in stationary bushing 47, namely for limiting both the rotary and axial stroke of the plunger. It might be added that actuating spring 50′ acts to keep the plunger in its axially normal position, whereas actuating spring 50 whose bent-up end portion bears against flat surface 46 tends to keep the plunger in its rotary normal position.

As will be appreciated from an inspection of FIGS. 1 and 2, turn contact 41 is connected in parallel to contact 26 of the hookswitch and serves to provide an alternative path for closing the line loop when key 40 is turned to its rotary-operated or "on" position to condition the telephone for loudspeaking operation. At the same time contact 43 is closed to interpose certain of the loudspeaking components, FIG. 2, in the line loop by way of conductors 53, 54, whereas contact 42 is opened to remove the short-circuit normally existing across these components. In this connection it will be noted that those portions of the substation circuit which, during handset operation or during loudspeaking operation of the system, form part of the direct-current line circuit fed by the central office battery, are shown in heavy lines in FIGS. 1 and 2. Push contact 44 serves to establish a short-circuit across microphone 55, FIG. 2, by way of conductors 51, 52 whenever this is desired while the system is conditioned for loudspeaking operation.

The part of the loudspeaking equipment proper, as far as mounted in the subset itself, is shown in FIG. 2. In addition to microphone 55 this part of the equipment includes induction coil 56, silicon-carbide resistor 31, a fixed resistance 61 and a potentiometer 60 for controlling the gain of the speaker amplifier, FIG. 3. The components shown in FIG. 2 also include neon tube 62 which serves to indicate that the system has been conditioned for loudspeaking operation and which, together with condenser 63, forms part of the gas tube oscillator; and they also include printed circuit card 80 which is of the plug-in type. Both the male terminals of the printed circuit card itself and the corresponding female terminals of the jack or connector receiving the card are indicated in FIG. 2.

As will be noted from FIG. 2, printed circuit card 80 mounts the following portions of the loudspeaking apparatus: diode bridge 33—35 which serves to maintain the bias voltages for the two voice amplifiers and the oscillator at the proper polarity irrespective of current reversal on the line circuit; compensating resistor 151 and filter elements 152–155 which are connected to the output of the diode bridge; the microphone amplifier comprising first-stage transistor 110 and resistance-coupled therewith, second-stage transistor 120; resistance bridge 140 which serves to keep the output of the microphone amplifier impressed on the resistance bridge from reaching the input of the speaker amplifier, FIG. 3; the transistor blocking oscillator which includes, in particular, transistor 130 and transformer 135; diode 138 and filter condenser 139 connected to the output winding of this transformer; and resistance 140′ which forms part of the gas tube oscillator.

As shown in FIG. 3, the equipment in the speaker cabinet includes the loudspeaker 65 itself and, in addition, another printed circuit card 90 mounting the speaker amplifier. This amplifier has a driver stage including transistor 160 and a push-pull stage including transistors 170, 180. The last-mentioned stage is coupled to the driver stage through transformer 167 and to the loudspeaker through transformer 194. All transistors on both circuit cards are P-N-P junction transistors used in grounded-emitter circuit arrangements.

The loudspeaking telephone, FIGS. 1–3, is connected by way of subscriber line 11 to the central office equipment shown in FIG. 4, the switching equipment in this office including line switch 400, selector 401 and connector 402. Also shown in FIG. 4 is a substation 450 to which a connection from the substation, FIG. 1, may be extended by means of the aforementioned central office switching equipment.

In now describing the operation of the system let us assume that the subscriber at the substation, FIGS. 1–3, wishes to make an outgoing call by means of his handset. Upon removal of the handset from the cradle the following loop circuit is closed at contact 26: ground, one winding of the line relay, not shown, of line switch 400, FIG. 4, line conductor 13, contact 42, compensating rheostat 80, transmitter 133, line winding 71 of induction coil 70, dial impulse springs 21, switchhook contact 26, line conductor 12, the other winding of the line relay, not shown, of line switch 400, FIG. 4, battery. Line switch 400 is caused to search for an idle selector in the well-known manner. Assuming selector 401 to be the one found, transmission battery feed is now transferred from the line relay in line switch 400 to the line relay, not shown, in selector 401 and dial tone is returned over line 11.

When the calling subscriber now dials the first digit, the corresponding interruptions of the loop circuit at contact 21 cause selector 401 to be set on the level terminating the desired group of connector trunks. Resistance 16 and condenser 17, FIG. 1, furnish spark suppression during dialling. Shunt springs 22 and 23 close on this and any following actuations of the dial. At shunt springs 22 a short-circuit is placed, by way of switchhook contact 27, across the whole of the transmission equipment, including circuit elements 71–75 as well as transmitter 133 and receiver 134; in addition, receiver 134 itself is short-circuited by way of shunt spring 23 and contacts 27.

On each actuation of the dial or, more specifically, during each return movement of the dial, station identifying springs 24 ground the line a predetermined number of times between dial pulses. In the local switch train these ground pulses are without effect but if a toll trunk circuit (not shown in FIG. 4) has been selected in the central office, a differential relay or a polarized relay in that circuit operates a corresponding number of times in response to these ground pulses. Thus, the identity of the calling one of a number of substations connected to a party line may be indicated to the trunk circuit in the well-known manner, for example, for purposes of toll ticketing.

Assuming connector 402 is the connector seized by selector 401, battery feed is now transferred from the selector line relay to line relay 420 of the connector, namely by way of contacts 413 and 411. The polarity of the transmission bridge in the connector is the same at this time as was that of the transmission bridge in line switch 400 and selector 401, that is, the direct current flowing over the loop circuit has the direction indicated by the full line arrows in FIG. 1.

When the connector, in response to the final digit of the called subscriber's number has been set on the bank contacts terminating line 14 of called subscriber's station 450 ringing current is transmitted to this station in the well-known manner. Ring cut-off relay 430 in operating upon the answering of the call at substation 450 causes back bridge relay 410 to operate over the called subscriber's loop. At its contacts 411, 412 and 413, 414 relay 410 reverses the polarity of the loop circuit extending over calling line 11, for instance for purposes of metering or supervision. Thus, the direct current flowing over conductors 12, 13 of the calling subscriber's line now assumes the direction indicated by the broken arrows in FIG. 1.

With the call answered at substation 450 the conversation between the calling and called subscribers may begin (by way of condensers 441, 442, FIG. 4). Considering first the outgoing speech channel in the substation circuit, FIG. 1, it will be noted that voice currents generated by transmitter 133 follow two parallel paths. The first path extends from the right-hand terminal of transmitter 133 by way of winding 71, contacts 21 and 26 to line conductor 12 and from left-hand terminal of transmitter 133 by way of compensating rheostat 80 and contact 42 to line conductor 13. This path is further completed by way of the switching equipment, FIG. 4, and called subscriber line 14 to substation 450. The second path is a local path that may be traced as follows: right-hand terminal of transmitter 133, condenser 74, induction coil winding 72, balancing resistance 75 and, in multiple thereto, induction coil winding 73 and receiver 134, and back to the left-hand terminal of transmitter 133. The voltage induced in anti-sidetone winding 73 balances the voltage drop across resistance 75 under ideal conditions so that no voice current traverses receiver 134.

As explained in the above Pye application, the components of the transmission circuit are selected so that optimum sidetone balance obtains on short lines. Under this condition much or all of rheostat 80 is included in the line circuit. On longer lines the line impedance is greater than corresponds to optimum anti-sidetone balance and on such lines the rheostat is set so that less additional resistance is included thereby. On very long lines the rheostat is completely shorted out by its slider 78 and in this position of the slider, contact 79 is closed to connect up auxiliary balancing network 76, 77. In this manner the large capacitive reactance of very long lines is compensated for, by the addition on the balancing side of the anti-sidetone circuit of auxiliary balancing network 76, 77.

Voice currents incoming over subscriber line 11 and traversing line winding 71 induce signal voltages in induction coil winding 72 which give rise to the flow of signal currents in the following circuit including receiver 134; lower terminal of winding 72, winding 73, receiver 134, transmitter 133, condenser 74, upper terminal of winding 72. The anti-sidetone circuit is so dimensioned that under conditions of perfect balance no voltage difference exists across balancing resistor 75 (and auxiliary balancing network 76, 77 if connected up) so that no energy is lost in these circuit elements.

It will be noted that, because of the short circuit placed across conductors 53, 54 at contact 42, neither the direct current nor the signal current flowing over the line traverses the portion of the line circuit shown in heavy lines in FIG. 2, as long as control key 40 is in its normal rotary position.

If the subscriber at the substation, FIGS. 1–3, wishes to make an outgoing call by means of microphone 55 and loudspeaker 65 he turns control key 40 into its "on" position without lifting the handset from the cradle. The direct current line circuit closed under this condition may be traced as follows: ground, one winding of the line relay, not shown, in line switch 400, FIG. 4, line conductor 13, conductor 54, strap 141 on printed circuit card 80, FIG. 2, silicon-carbide resistor 31, primary winding 57 of induction coil 56, conductor 53, contact 43, impulse springs 21, contact 41, line conductor 12, the other winding of the line relay, not shown, of line switch 400, FIG. 4, battery. It will be noted that due to the actuation of the turn springs of key 40, impulse springs 21 of the dial in the subset as well as primary winding 57 of induction coil 56 and non-linear resistor 31 have been included in the line circuit; and that a short-circuit extending over contact 43 has been placed across the whole of the transmission equipment in the subset, including rheostat 80. This last-mentioned short-circuit has thus been substituted for the short-circuit normally existing, by way of contact 42, across conductors 53, 54.

In order to set up a connection to subscriber station 450, FIG. 4, the calling subscriber now actuates his dial just as described above for a handset-initiated call. On each actuation of the calling device the dial shunt springs close. However, as the contacts of hookswitch 25 in the instant case are in their normal position the closure of shunt springs 22 causes a short-circuit to be placed, by way of contacts 43, 22 and 28, across conductors 53, 54, that is, across the direct-current and signal-current input circuit of the loudspeaking system. This prevents dial clicks from being produced in the loudspeaker and it also prevents induction coil 56 and silicon-carbide resistor 31 from affecting transmission of the dial pulses. In this manner desirable impulsing characteristics are maintained, particularly on long loops where the direct-current resistance of resistor 31 rises to fairly high values.

As long as the direct-current flowing in the line circuit last-traced has the direction indicated by the full line arrows, FIG. 1—as it has, for example, during the receipt of dial tone from selector 401—the voltage drop in silicon-carbide resistor 31 which is included in this circuit causes a positive potential to be developed on the right-hand terminal and a negative potential on the left-hand terminal of this resistor as viewed in FIG. 2. As a result a positive potential is set up at the top terminal of the rectifier bridge as viewed in FIG. 2, namely through diode 35 and a negative potential is set up at the bottom terminal of this rectifier, namely through diode 32. These are the potentials required to supply both transistor amplifiers as well as the transistor blocking oscillator with the proper operating voltages.

Upon answering of the called subscriber, back bridge relay 410 in operating causes the direct-current flowing over the calling subscriber line to assume the direction indicated by the broken arrows in FIG. 1. Consequently, a positive potential is now developed at the left-hand terminal of resistor 31 and a negative potential at the right-hand terminal of this resistor. However, due to the action of rectifier bridge 32—35 positive potential remains set up at the top terminal of the rectifier bridge and negative potential at the bottom terminal of this bridge, diodes 34 and 33 being conductive in the instant case instead of diodes 35 and 32.

The advantages of the combination including non-linear resistor 31 and the bridge arrangement of germanium diodes 32—35 have been set out in the above-mentioned application of Faulkner et al. Suffice it to say here that due to the decrease of resistance of resistor 31 with an increase of current the supply voltage to the transistor equipment varies by only a small amount, say between 5 and 8 volts, over a considerable range of line current, for example, between 25 and 100 milliamperes. Since the maximum undistorted power output of the amplifiers is a function of the power supply voltage this regulating effect of the silicon-carbide resistor on the supply voltage is highly desirable. In this manner the output of the two amplifiers, and also that of the blocking oscillator, is made reasonably independent of the line loop. At the nominal line current of 60 milliamperes the direct-current resistance of resistor 31 is 100 ohms.

It will be noted from FIGS. 2 and 3 that the positive terminal of diode bridge 32—35 is connected to common conductor CC of printed circuit card 80 and is also connected by way of cable conductor 92 to common conductor CC' of printed circuit card 90. Negative potential for all transistor circuits, FIGS. 2 and 3, is derived from the negative terminal of diode bridge 32—35 through compensating resistor 151; a filter condenser 154 is connected between the lower terminal, FIG. 2, of this compensating resistor and common conductor CC. The negative power supply to the speaker amplifier, FIG. 3, is obtained from the last-mentioned terminal of resistor 151 directly, namely by way of conductor 93; the negative power supply to the microphone amplifier, on the other hand, is obtained from that terminal via filter section 152, 156, and the negative supply to the transistor oscillator via filter section 153, 155. Typical values of current drain for these three transistor circuits are 11, 6 and 3 milliamperes, respectively.

The filter arrangement 151–156 as a whole serves to substantially prevent signal currents transmitted over the line in one or the other direction (as described below) from resulting in a corresponding modulation of the power supply voltages to the various transistor units. This greatly reduces the danger of spurious oscillations being set up in the voice amplifiers due to acoustic feedback between loudspeaker and microphone. Mutual interference between the various transistor units, furthermore, is counteracted by the fact that the power supply to the microphone amplifier is separated or "decoupled" from the power supply to the speaker amplifier by means of filter section 152, 156; and that the power supply to the transistor oscillator is decoupled from that to the speaker amplifier by means of filter sections 153, 155 and from that to the microphone amplifier by means of both filter sections 153, 155 and 152, 156 in series.

Compensating resistor 151 which is traversed by the direct-current supplied to all three circuits functions to keep the supply voltage within limits even in case the subscriber line is connected to the central office battery through a transmission bridge of exceptionally low resistance, as used, for example, on certain toll trunks. To this extent compensating resistor 151 supplements the regulating function of silicon-carbide resistor 31. Typical values for the components used in the above filter arrangement are as follows:

Resistance 151= 56 ohms
Resistance 152=270 ohms
Resistance 153=270 ohms
Condenser 154= 50 microfarads
Condenser 155= 15 microfarads
Condenser 156= 25 microfarads As mentioned above, all transistors, FIGS. 2 and 3, are used in a grounded-emitter circuit. Thus, emitters 112, 132, 172 and 182 are connected to the positive terminal of the power supply directly, namely via the respective common conductors CC and CC'; emitter 122 of transistor 120 is connected to common conductor CC by way of negative-feedback resistor 125; and emitter 162 of transistor 160 is connected to common conductor CC' through negative-feedback resistor 166.

Negative potential is supplied to collector 113 through first-stage load resistor 116; to collector 123 through primary winding 128 of output transformer 127; to collector 133' through the upper section of primary winding 136 of transformer 135; to collector 163 through primary winding 168 of coupling transformer 167; and to collectors 173 and 183 through the primary winding 195 of output transformer 194. Base electrodes 111, 121 and 161 are kept at the required intermediate potential by means of self-bias resistors 115, 124 and 165 in the well-known manner. The necessary intermediate potential for the bases 171, 181 of transistors 170, 180 is obtained through the medium of voltage divider 191, 192 which is connected across power supply conductors 93, 92 of the speaker amplifier. Base 131 of the transistor oscillator is connected to negative potential via timing resistor 133''.

The signal output of the microphone amplifier and the signal input of the speaker amplifier are coupled to the line through resistance bridge 140 and induction coil 56. More particularly, it will be noted that secondary winding 129 of output transformer 127 of the microphone amplifier is connected between the upper and lower terminal, FIG. 2, and hence across one diagonal of resistance bridge 140. The series combination of resistance 61 and speaker-gain control potentiometer 60, on the other hand, is connected via conductor CC to the left and right terminals, that is, across the other diagonal of this bridge; the input signal to the speaker amplifier is derived from components 60 and 61 by way of cable conductors 91 and 92.

The secondary winding 58 of induction coil 56 is connected directly across the upper left resistance 141 of bridge 140. Resistors 141, 143, 144 may all have the same resistance value, for example, 1000 ohms while resistor 142 preferably is of a slightly lower value, say 760 ohms, to make up for the parallel connection of the line, through induction coil 56, to resistor 141. Under ideal conditions the bridge thus is at balance, and as a result, the amplified signal coming from the microphone is substantially kept from reaching the input circuit of the speaker amplifier. On the other hand, due to the unsymmetrical connection of winding 58 to the resistance bridge, part of the output voltage of the microphone amplifier appears across winding 58 of induction coil 56 and is thus impressed on the line and, conversely, part of the incoming signal voltage developed across winding 58, is impressed on the speaker amplifier input. Losses in the resistance bridge are recovered by corresponding amplification in the two voice amplifiers.

Let us now revert to the description of the connection which has been completed by the subscriber at the substation, FIGS. 1–3, to substation 450, FIG. 4, with control key 40 in its rotary-operated position. Outgoing signal voltages developed across the terminals of microphone 55 during conversation are impressed on a circuit extending through condenser 114, base 111 and emitter 112 of transistor 110, back through resistor 125. The output circuit of transistor 110 which extends from collector 113 through resistor 116 and electrolytic condenser 156 to emitter 112 is coupled to base 121 of second-stage transistor 120 by way of condenser 117. The output circuit of transistor 120 extends from collector 123 through primary winding 128 of output transformer 127, filter condenser 156 and resistor 125 to emitter 122. Condenser 126 is connected in parallel with winding 128 to improve frequency response. Resistor 125 being common to the first-stage input circuit and second-stage output circuit provides overall negative feedback. This aids in rendering the amplifier gain largely independent of any remaining variations in the power supply voltage. The amplified signal voltages are impressed on the line circuit through the medium of transformer 128, resistance bridge 140 and induction coil 56 as above explained.

Signal currents incoming over the line and flowing through the primary winding 57 of induction coil 56 cause corresponding signal voltages to be impressed, through resistance bridge 140, on the series combination of resistor 61 and potentiometer 60 as described. Due to the provision of resistor 61 a residual signal voltage will remain across conductors 91, 92 leading to the speaker amplifier input even though gain control potentiometer 60 is fully turned down. This arrangement has the advantage that dial tone (in the case of an outgoing call) or the initial words of the distant party (particularly in the case of an incoming call) are distinctly heard regardless of the volume control setting. A series resistance 61 of 56 ohms, for example, may be used in conjunction with a potentiometer 60 having an overall resistance of 1,000 ohms.

In FIG. 3 the input circuit to the speaker amplifier is completed from conductor 91 through condenser 164, base 161 of transistor 160, emitter 162 of this transistor and resistor 166 back to conductor 92. The output circuit of this transistor extends from collector 163 through primary winding 168 of coupling transformer 167, filter condenser 154, FIG. 2 (which is connected across conductors 93, 92), resistor 166, to emitter 162. The second stage of the speaker amplifier is a push-pull stage for greater power output. The input circuit of this stage includes secondary winding 169 of transformer 169, the bases 171 and 181 of both transistors 170 and 180, the emitters 172 and 182 of both transistors and resistor 192 the left-hand terminal of which is connected to the center point of winding 169.

The output circuit of transistors 170, 180 includes collectors 173 and 183, primary winding 195 of output transformer 194, the center tap of this winding, condenser 154, FIG. 2, (through conductors 93, 92) and emitters 172, 182. Condenser 193 is connected in multiple with winding 195 to improve frequency response. The amplified signal voltages are impressed by secondary winding 196 on loudspeaker 65 in which the voice of the distant party at substation 450 is thus reproduced. A portion of the signal voltage developed across winding 196 is fed back to resistor 166, viz via resistance 197 and conductor CC'. Since resistor 166 thus is common both to the driver-stage input circuit and the power-stage output circuit of the speaker amplifier it provides overall negative feedback for greater stability and voltage regulation.

The following are representative values for the components used in the two voice amplifiers:

| | | |
|---|---|---|
| Resistance 115 | ohms | 240,000 |
| Resistance 116 | do | 1,500 |
| Resistance 124 | do | 240,000 |
| Resistance 125 | do | approx. 8 [1] |
| Resistance 165 | do | 330,000 |
| Resistance 166 | do | 12 |
| Resistance 197 | do | 100 |
| Resistance 191 | do | 4.700 |
| Resistance 192 | do | 150 |
| Condenser 114 | microfarads | 25 |
| Condenser 117 | do | 8 |
| Condenser 126 | do | .01 |
| Condenser 164 | do | 8 |
| Condenser 193 | do | .1 |

[1] Factory adjusted.

At the time control key 40 originally was placed in its rotary "on" position and silicon-carbide resistor 31 accordingly included in the direct-current line circuit, operating voltage was also supplied, via filter section 153, 155 to the transistor oscillator which powers pilot lamp 62. This oscillator serves to produce relatively high voltage pulses in the step-up winding 137 of transformer 135 at a repetition rate in the voice frequency range which depends on the values of timing condenser 134' and timing resistor 133'. These values may be, for example, 0.1 microfarad and 15,000 ohms respectively. The operation of the transistor oscillator roughly is as follows:

Initially condenser 134' is in a highly charged condition, holding base 131 of transistor 130 positive with respect to emitter 132. As condenser 134' discharges through resistor 133'' and the lower section of winding 136 the base becomes less positive. When the charge on the condenser has dropped to the point where it merely offsets the opposite voltage of the power supply, emitter current begins to flow. This, in turn, gives rise to the flow of collector current in a circuit including the upper section of winding 136, filter condenser 155 and emitter 132. The inverse voltage thus induced in the lower section of winding 136 aids in driving base 131 negative with respect to the emitter, whereby the emitter current is regeneratively, and hence rapidly, increased. As the condenser is charged (positively on its base-connected terminal) by the emitter current the latter decreases because the base becomes less negative with respect to the emitter. When the emitter current has fallen to the point where the required collector current can no longer be maintained the negative base voltage is further reduced. This causes a further decrease in the emitter current so that the transistor regeneratively cuts itself off. The condenser is left at a positive potential (on its base-connected terminal) and begins again to discharge through resistor 133″.

The corresponding sharp pulses which are induced in secondary or step-up winding 137 transformer 135 are rectified in diode 138 and filtered in condenser 139 to furnish a direct-current supply of relatively high voltage, say 100 volts, to the gas tube oscillator comprising timing resistor 140′, timing condenser 63 and neon tube 62. This tube, therefore, will be flashed as condenser 63 is alternately discharged through tube 62 and charged through resistor 140′, and this flashing operation persists as long as key 40, FIG. 1, is left in its rotary-"on" position. The rate at which the tube is flashed depends on the values of condenser 139 and resistance 140′. A suitable flashing operation, say at a rate of approximately 150 interruptions per minute, may be obtained, for example, with a 1 microfarad condenser, a 1 megohm resistance and a neon tube having a striking voltage of approximately 85 volts. It will be noted from FIG. 2 that connected in series with secondary winding 137 of transformer 135 and diode 138 the power supply voltage (across condenser 155) for the transistor blocking oscillator. This serves to further boost the direct-current operating voltage for the neon tube relaxation oscillator.

If the subscriber at the substation, FIGS. 1–3, wishes to exclude the distant party from what is being said in the premises, for example, by persons gathered around the conference table, he depresses key 40 without changing the rotary position of the key. The resultant closure of contact 44 places a short-circuit across microphone 55 by way of conductors 51, 52 so that the outgoing speech channel is disabled. This condition is removed as soon as the subscriber in releasing the key permits plunger 45 to return to its axially normal position under the action of spring 50′.

If the subscriber now wishes to switch the telephone from loudspeaking operation to handset operation, for example, in order to insure full privacy for some part of his conversion with the distant party at substation 450, he lifts the handset from the cradle and subsequently turns key 40 back into its rotary-"off" position. These manipulations place the telephone, without interruption of the direct-current line circuit, in the condition described above in connection with a call originated by lifting the handset. In particular, the portion of the loop including non-linear resistor 31 and induction coil winding 57, FIG. 2, is replaced by a short-circuit through contact 42 while the short-circuit formerly existing across the transmission equipment in the subset is removed by the opening of contact 43. With the power supply equipment, FIG. 2, thus rendered ineffective, pilot lamp 62 ceases to flash. If the subscriber at any time during a call wishes to switch (or return) to loudspeaking operation the sequence of manipulations is the reverse, that is the subscriber first turns key 40 "on" and then replaces the handset.

In the above description of the operation of the telephone circuit, FIGS. 1–3, it was assumed that the subscriber at this telephone was engaged in an outgoing call. If this telephone happens to be the called telephone, ringing current is transmitted thereto from connector 402, namely over the following circuit: battery-connected ringing generator 443, FIG. 4, upper winding of ring cut-off relay 430, contact 431, wiper 415, line conductor 12, condenser 14, FIG. 1, ringer 15, line conductor 13, wiper 416, FIG. 4, contact 434, ground. The party at the subset, FIG. 1, answers the call either by lifting the handset from the cradle or turning control key 40 to its rotary-"on" position. As a result ring cut-off relay 430 operates, thereby switching called line 11 through to back bridge relay 410, whereupon the conversation between the calling and called subscribers may begin.

It will be noted that in this case the direction of the direct-current flow over the subscriber line during conversation is as indicated by the arrows shown in full line in FIG. 1; that is, it is the same as it was in the above described outgoing call prior to answering and opposite to what it was in that call during conversation. Due to rectifier bridge 32, 35, FIG. 1, the polarity of the power supply is the same in all cases.

Figure 5:
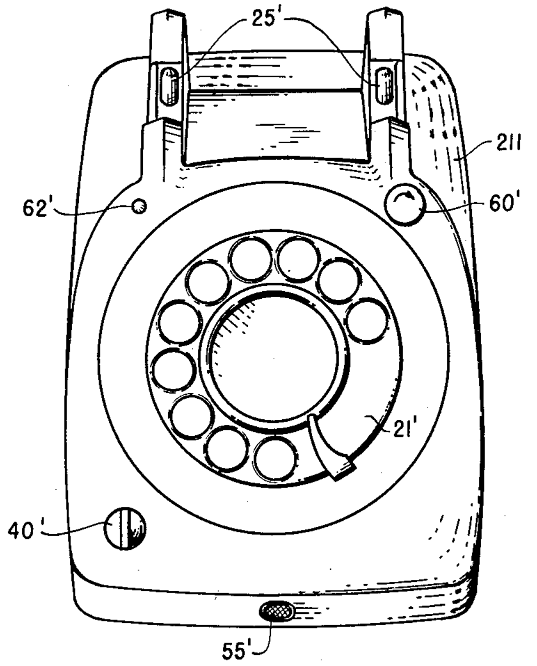
FIG. 5 shows the exterior of the subset as viewed from a point above and in front thereof.
Figure 6:
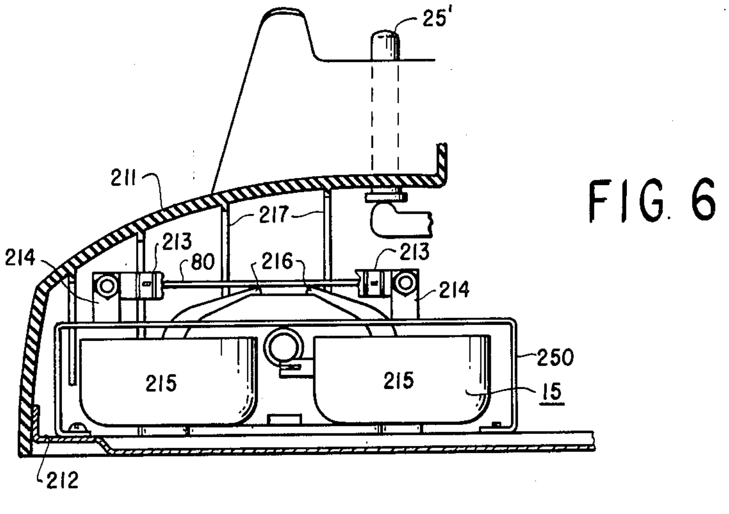
FIG. 6 is a section through the rear portion of the subset illustrating the way in which the printed circuit card mounting the microphone amplifier and other loudspeaking components is mounted in the subset on top of the ringer.
Figures 7, 8:
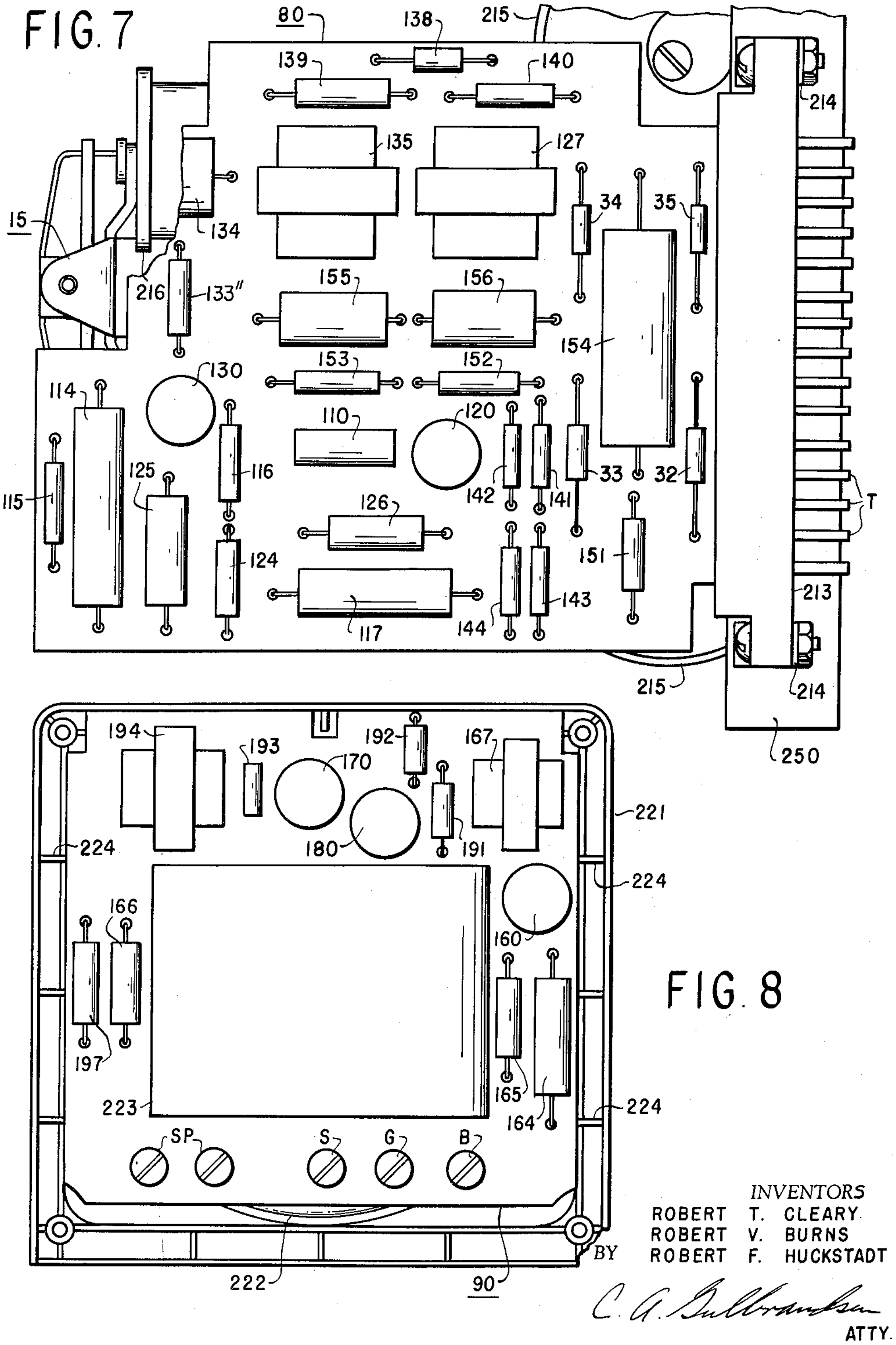
FIG. 7 is a top view of this printed circuit card as mounted in the subset.
FIG. 8 is a rear view of the speaker cabinet with the other printed circuit card mounted therein.

FIGS. 5–7 illustrate how the various loudspeaking components are accommodated in a subset of modern construction. The subset of the general design to which this preferred mounting arrangement applies has been disclosed in design application Serial No. 32,539, filed by J. A. Hill on October 5, 1954. Reference is also made to United States Patent 2,726,292 which issued to R. L. Sargisson and F. E. Wood on December 6, 1955.

FIG. 5 shows the exterior of the subset with the handset removed. 21′ is the finger plate of the dial, 25′ are the plungers of the hookswitch which cooperate with the handset when placed upon the cradle, and 55′ is the grille of the microphone which is mounted in the lower front portion of subset housing 211. The loudspeaking controls of the telephone include a control knob 60′ for gain control potentiometer 60 which is mounted to the upper right of the dial; an actuating member 40′ for control key 40 which is mounted to the lower left of the dial, and a jewel 62′ for pilot lamp 62 which is mounted to the upper left of the dial.

As shown in FIGS. 6 and 7, printed circuit card 80 is mounted in the substantially flat space between the top of ringer 15 and the rear portion of the housing shell 211 of this subset. Ringer 15, in turn, is mounted on subset base 212, see for example, United States Patent 2,737,651 issued to O. W. Henrikson on March 6, 1956. Printed circuit card 80 which is of the plug-in type is carried by connector 213 which is secured by means of lugs 214 to a substantially U-shaped bracket 250 mounted on base 212 and straddling gongs 215 of ringer 15. This mounting arrangement for the printed circuit card is similar to that disclosed in the above mentioned copending application Serial No. 624,765 of A. H. Faulkner and H. C. Talcott.

In FIG. 6 most of connector 213 has been broken away to show how the far end of printed circuit card 80 rests on the far spool heads 216 of the ringer, these spool heads, like the circuit card itself, being of insulating material. In the assembly of a subset when housing shell 211 is placed on base 212 a shoulder in ribs 217 of the plastic shell engages the far end of printed circuit card 80 whereby this card in effect is held between ringer spool heads 216 and housing ribs 217.

The circuit components mounted on the card which are shown in FIG. 2 also appear in FIG. 7, corresponding reference numerals being used in the two figures. In particular it will be seen from FIG. 7 how not only the components of the microphone amplifier itself but also those of the transistor oscillator, the filter, the rectifier bridge and the resistance bridge are mounted directly on the top side of printed circuit card 80. The required printed-wiring connections between the individual circuit components and between these components and the card terminals T are made on the bottom side of the card in accordance with well-known technique.

The plug-in type of printed wiring board with its matching connector makes it possible to utilize a maximum amount of the limited space available in a subset of modern design without preventing access to the components of the telephone set. The plug-in type feature itself is an advantage in servicing because a good unit can be immediately substituted for a defective one and the latter can be replaced at a convenient time on the bench. In this connection it should be noted that even though printed circuit card 80 (and, for that matter, also printed circuit card 90) be removed, operation of the substation by means of the handset is in no manner interfered with. Reverting to FIG. 2, if card 80 is removed the loudspeaking portion of the line circuit extending over conductors 53, 54, is opened, as a matter of precaution, at the card terminals terminating strap 141. This avoids damage to silicon-carbide resistor 31 due to overheating by the line current, namely in case control key 40 is turned "on"—in spite of the fact that card 80 is removed and, hence, the various circuit elements normally shunting resistor 31 are disconnected.

Silicon-carbide disk 31 itself, together with its cooling fin or "heat sink," may be mounted in any convenient location, such as the space between the top of bracket 250 and the bottom of connector 213; induction coil 56 and resistor 61, FIG. 2, may be accommodated on one side of the ringer, for example.

FIG. 8 shows the speaker cabinet from the rear, with the rear cover of this cabinet removed. 221 is the speaker cabinet itself which is molded of a plastic material while 222 is part of the speaker frame and 223 the speaker magnet. As will be seen from FIG. 8, printed circuit card 90 has a large rectangular cut-out in its center so that card 90 rests between the speaker magnet and ribs 224 of the speaker cabinet. The components of the speaker amplifier which are mounted on printed circuit card 90 are shown in FIG. 8 with the same reference numerals that are used for these components in FIG. 3. Connecting terminals S, G, B and SP also will be recognized in FIG. 8. Printed-circuit connections on the rear of the card are used to connect these various components with each other and with the terminals shown. Any convenient method may be used to secure card 90 in place in the speaker cabinet.

While only certain embodiments of the invention have been illustrated and described it is to be understood that numerous modifications in the details of arrangement may be resorted to without departing from the true spirit and scope of the invention as defined in the appended claims.

For example, in the loudspeaking telephone system illustrated in the drawings one of the two voice amplifiers has been shown mounted in a separate unit, namely in the cabinet housing the corresponding distant-talking transducer. Such a separate cabinet is desirable because it permits spacing the microphone and loudspeaker apart and thereby reduces the danger of acoustic feedback. However, by way of modification it is also possible to mount both amplifiers on the same card or board in the subset itself. Furthermore, while in the embodiment disclosed herein the manual control means for switching the system from handset operation to loudspeaker operation or vice versa are in the form of a single key it is also possible to effect the necessary circuit transfer at the contacts of two mechanically interlocked push-keys of which the one serves as an "on" key and the other as an "off" key.

The circuit arrangements of the telephone system disclosed herein which relate to the broad feature of powering a lamp at a substation through the medium of a transistor oscillator thereat which is supplied with direct current from the central battery by way of the subscriber line, are claimed in a copending divisional application Serial No. 109,065 filed May 10, 1961.

What is claimed is:

1. A loudspeaking telephone system comprising a substation having a handset with a transmitter and receiver, a central office with a central office battery, a subscriber line connected to said central office and said battery and also to said substation, a loop circuit extending over said line for the transmission of both battery current and voice frequency signal current between said central office and said substation, signal coupling means for coupling said line for signal transmission to said transmitter and receiver, a microphone and a loudspeaker at said substation, two voice frequency transistor amplifiers respectively connected to said microphone and speaker, other coupling means for coupling said line for signal transmission to said amplifiers, said loop circuit having two branches, the first branch including said first-mentioned signal coupling means, and the second branch including said second-mentioned signal coupling means and also including a rectifier bridge for deriving from said loop circuit direct current operating power for said transistor amplifiers at a polarity independent of that of the line, and manually controlled switching means for selectively making one or the other of said two branches effective.

2. A loudspeaking telephone system comprising a subset having a calling device with impulse springs and having two transducers for handset operation, namely a transmitter and receiver, a central office with a central office battery, a subscriber line connected to said central office and said battery and also to said substation, a loop circuit extending over said line for the transmission of both battery current and voice frequency signal current between said central office and said substation, signal coupling means for coupling said line for signal transmission to said transmitter and receiver, two transducers for loudspeaking operation, namely a microphone and a loudspeaker, two voice frequency transistor amplifiers respectively connected to said microphone and speaker, one of said second-mentioned transducers as well as the corresponding amplifier being mounted in said subset, other coupling means for coupling said line for signal transmission to said amplifiers, the last-mentioned coupling means being substantially balanced to substantially prevent spurious oscillations from being set up due to acoustic feedback between said speaker and said microphone, said loop circuit which has said impulse springs interposed therein having two branches, the first branch including said first-mentioned signal coupling means, and the second branch including said second-mentioned signal coupling means and also means for deriving from said battery by way of said line a direct current power supply for said transistor amplifiers, and manually operated switching contacts for selectively making one of said two branches effective and the other ineffective.

3. A loudspeaking telephone system comprising a substation having a handset with a transmitter and receiver, a central office with a central office battery, a subscriber line connected to said central office and said battery and also to said substation, said system also comprising two transducers for loudspeaking operation, namely a microphone and a loudspeaker, a transistor amplifier connected to said microphone for amplifying voice frequencies outgoing therefrom over said line, a transistor amplifier connected to said speaker for amplifying voice frequencies incoming thereto over said line, manually operated switching contacts for selectively causing either said handset or said microphone amplifier and speaker amplifier to be effectively connected to said line, a transistor blocking oscillator having a pair of load terminals, a gas tube connected to said terminals for indicating the condition of said switching contacts, and means at said substation and common to said transistor amplifiers and said transistor oscillators for deriving from said battery by way of said line a direct current power supply for said amplifiers and said oscillators, said power supply means including a rectifier bridge for insuring the proper polarity of said power supply independently of the polarity of said line, and filter means connected to the output of said bridge for substantially decoupling said amplifiers and said oscillators from each other and from said line for alternating current.

References Cited in the file of this patent

UNITED STATES PATENTS

| | | |
|---|---|---|
| 2,214,992 | Chevassus | Sept. 17, 1940 |
| 2,542,921 | Giannini | Feb. 20, 1951 |
| 2,550,518 | Barney | Apr. 24, 1951 |
| 2,629,024 | Edwards | Feb. 17, 1953 |
| 2,772,410 | Logue et al. | Nov. 27, 1956 |
| 2,776,420 | Woll | Jan. 1, 1957 |
| 2,785,231 | Chase | Mar. 12, 1957 |
| 2,801,287 | Clemency | July 30, 1957 |
| 2,844,658 | Wernick | July 22, 1958 |
| 2,885,484 | Faulkner et al. | May 5, 1959 |

FOREIGN PATENTS

| | | |
|---|---|---|
| 743,024 | Great Britain | Jan. 4, 1956 |